United States Patent
Frank et al.

(10) Patent No.: US 6,499,072 B1
(45) Date of Patent: Dec. 24, 2002

(54) DATA BUS BANDWIDTH ALLOCATION APPARATUS AND METHOD

(75) Inventors: Michael Frank, Newtown, PA (US); John Raymond Wiseman, Newtown, PA (US)

(73) Assignee: ATI International Srl, Barbados (BB)

( * ) Notice: Subject to any disclaimer, the term of this patent is extended or adjusted under 35 U.S.C. 154(b) by 0 days.

(21) Appl. No.: 09/388,975

(22) Filed: Sep. 2, 1999

(51) Int. Cl.[7] .............................................. G06F 13/00
(52) U.S. Cl. .......................... 710/100; 710/29; 710/60; 709/102
(58) Field of Search ................................ 710/310, 315, 710/100, 29, 52, 58, 57, 60, 59, 112, 118; 709/100, 102, 104

(56) References Cited

U.S. PATENT DOCUMENTS

| | | | |
|---|---|---|---|
| 5,261,099 A | * 11/1993 | Bigo et al. | 709/102 |
| 5,367,331 A | * 11/1994 | Secher et al. | 348/14.01 |
| 5,940,369 A | * 8/1999 | Bhagavath et al. | 370/229 |
| 6,035,333 A | * 3/2000 | Jeffries et al. | 370/445 |
| 6,263,020 B1 | * 7/2001 | Gardos et al. | 348/419.1 |
| 6,324,165 B1 | * 11/2001 | Fan et al. | 370/232 |
| 6,353,685 B1 | * 3/2002 | Wu et al. | 375/240.03 |

FOREIGN PATENT DOCUMENTS

JP          405227194 A    * 9/1993

* cited by examiner

Primary Examiner—Xuan M. Thai
(74) Attorney, Agent, or Firm—Vedder, Price, Kaufman & Kammholz

(57) ABSTRACT

A data bus bandwidth allocation apparatus and method uses buffer entry feedback data from a buffer, such as an overflow buffer, that receives requested data over an unregulated bus. The data bus bandwidth allocation method and apparatus generates data issue delay data based on the buffer entry feedback data to adjust data commands to a data source, such as frame buffer memory used to feed a regulated bus. In one embodiment, the data issue rate regulator utilizes a programmable threshold corresponding to a threshold of data entries in an overflow. The overflow FIFO has feedback indicating, for example, the number of free entries or the number of full entries. The data issue rate regulator provides data rate regulation information to an adjustable delay sequencer. The adjustable delay sequencer selectively sequences data reads from the frame buffer memory so that data collisions do not occur over the memory read backbone.

46 Claims, 4 Drawing Sheets

SEQUENCER WITH
ADJUSTABLE DELAY

DATA ISSUE RATE REGULATOR

DATA BUS BANDWIDTH ALLOCATION APPARATUS AND METHOD

FIELD OF THE INVENTION

The invention relates generally to data bus bandwidth allocation apparatus and methods and more particularly to data bus bandwidth allocation apparatus and methods for allocating bandwidth for memory reads.

BACKGROUND OF THE INVENTION

Data processing systems, such as computers, telecommunication systems and other devices, may use common memory that is shared by a plurality of processors or software applications. For example, with computers, a processor, such as a host processor, may generate data for other processing devices or processing engines and may need to communicate the processed data over a bus. In systems that also employ video processing or graphics processing devices, such systems may employ memory such as frame buffers which store data that is used by memory data requesters such as 3D drawing engines, display engines, graphic interface providing engines, and other suitable engines. Memory controllers use request arbiters to arbitrate among client's memory read and write requests to decide which client will receive data from system memory or from the frame buffer. A memory controller typically processes the memory requests to obtain the data from the frame buffer during memory reads or from an input data buffer (FIFO) associated with the host processor.

A problem arises when the amount of data delivered by the parallel access to system and local memory exceeds the data throughput capacity of the bus(es) providing the data transport from the memory controller to the clients. As such, memory controllers can receive more data from memory than they may be able to output to memory read backbones (e.g., buses) to the plurality of requesters requesting data from the frame buffer or from the host processor. As a result, collisions can occur creating an efficiency problem and potential data throughput bottlenecks. One solution is to add an additional bus to the memory read backbone for peak demand periods when, for example, all requesters are requesting data and their demands can be fulfilled by concurrent read activity to both frame buffer and system memory. However, such a system can be prohibitively costly due to layout complexity on an integrated circuit and may also require three (or more) port data return buffers that can accept read data on all ports every clock cycle. Some known processing systems use dual read buses to facilitate higher throughput from memory reads but would require a third bus to handle the peak bandwidth requirements.

The problem can be compounded when the host system's memory controller returns data in an unregulated fashion, namely, whenever the host processor does not make requests and the full bandwidth of the system memory becomes available. Typically, the memory controller can control the rate at which data is read from the frame buffer but has no control over when and how much data is available from the host processor. As such, there is no control over one data source but such systems typically have the ability to control the amount and frequency of data the memory controller obtains from the frame buffer memory. Such systems use FIFO data buffers to help reduce overflow problems, but even with deep buffers overflowing can not be avoided if the ratio between memory bandwidth and transport bandwidth is high. However, with real time requesters, such as audio and video processors, data can be lost if not processed when made available. Also, known systems, such as video and graphics processing systems, may include memory request sequencers which obtain the appropriate amount of data per request from a frame buffer over one or more channels. In addition, such systems may have a multiplexing scheme which multiplexes data from the host processor with data from the frame buffer so that it is passed to the memory read backbone to the requisite memory requesters. However, known systems typically encounter data collision conditions through such multiplexing schemes when a plurality of requesters are requesting data from the frame buffer and data from another source such as a host processor.

Consequently, there exists a need for a data bus bandwidth allocation apparatus that facilitates suitable bandwidth allocation in a system that has an unregulated bus, such as a bus from the host processor or other source, and a regulated bus such as a memory bus between a memory controller and a frame buffer memory or other requested bus.

BRIEF DESCRIPTION OF THE DRAWINGS

The disclosed invention will be more readily understood in view of the below-identified figures, wherein.

DETAILED DESCRIPTION OF A PREFERRED EMBODIMENT OF THE INVENTION

Briefly, a data bus bandwidth allocation apparatus and method uses buffer entry feedback data from a buffer, such as an overflow buffer, that receives requested data over an unregulated bus. The data bus bandwidth allocation method and apparatus generates data issue delay data based on the buffer entry feedback data to adjust data commands to a data source, such as frame buffer memory used to feed a regulated bus. In one embodiment, the data issue rate regulator utilizes a programmable threshold corresponding to a threshold of data entries in a FIFO buffer. The overflow FIFO has feedback indicating, for example, the number of free entries or the number of full entries. The feedback data is used by the data issue rate regulator. The data issue rate regulator provides data rate regulation information to an adjustable delay sequencer. The adjustable delay sequencer selectively throttles data reads from the frame buffer memory so that data collisions do not occur over the memory read backbone. As such, the data that is provided over the unregulated bus is allowed to freely be sent over the memory read backbone. The rate at which data is obtained from the frame buffer is regulated under control of the adjustable delay sequencer which adjusts the amount of delay between consecutive memory reads to facilitate an efficient bandwidth allocation of the memory read backbone.

Figure 1:
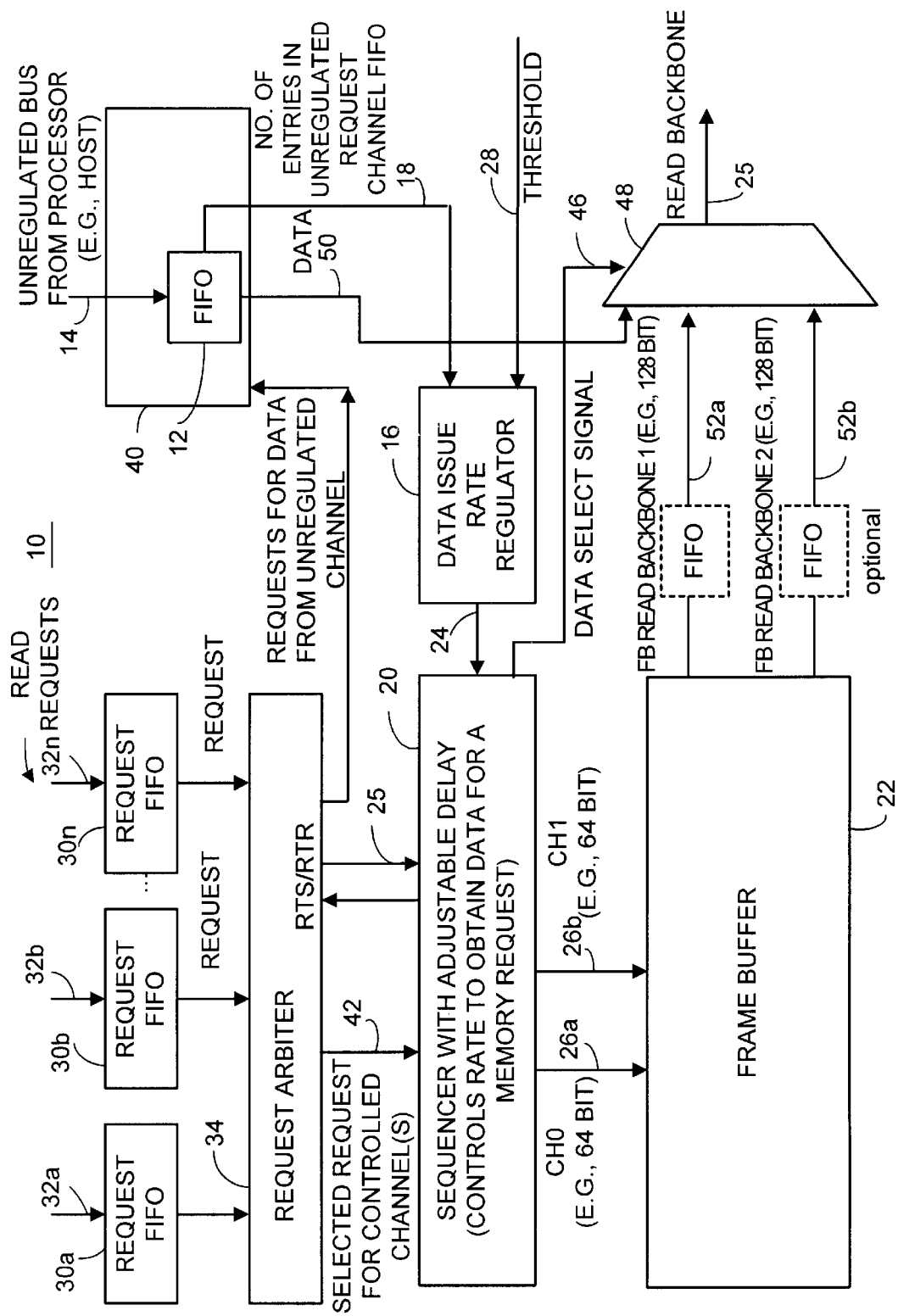
FIG. 1 is a block diagram illustrating one example of a data bus bandwidth allocation apparatus in accordance with one embodiment of the invention.

FIG. 1 illustrates an apparatus 10 incorporating one example of a data bus bandwidth allocation apparatus that includes a buffer 12, such as an overflow FIFO, operatively coupled to receive requested data from an unregulated bus, a data issue rate regulator 16 operatively coupled to receive buffer entry feedback data 18 from the buffer 12, and an adjustable delay sequencer 20 operative to adjust data read commands to a data source, such as frame buffer 22 that feeds the regulated bus 26a and 26b. In this example, the regulated bus 26a and 26b is a memory command bus.

The sequencer 20 with the adjustable delay control receives data issue delay data 24 from the data issue rate regulator 16. The data issue delay data 24 indicates, for example, the amount of delay that the sequencer 20 needs to provide for adjusting data read commands over regulated channels 26a and 26b from the frame buffer 22 to allow all of the data from the unregulated bus to be transferred over the memory read backbone 25. As such, the adjustable delay sequencer 20 adjusts data command flow over the regulated bus 26a and 26b in response to the data issue delay data to avoid data collision between data returned from frame buffer memory 22 and data returned from FIFO buffer 12.

The buffer entry feedback data 18 may represent, for example, the number of empty entries left in the buffer 12, also referred to herein as the uncontrollable request channel FIFO. The entry feedback data 18 may also be the number of full entries or any other suitable feedback data. The data issue rate regulator 16 utilizes a programmable threshold 28 to control the amount of rate regulation. As such, if the threshold 28 is adjusted, the rate at which the sequencer issues read commands for the frame buffer will vary accordingly. The entry feedback data 18 and stored threshold value 28 may be provided by a state machine or may take any suitable form.

As shown, the system may also, if desired, include a plurality of request FIFOs 30a–30n, which store read requests from a plurality of memory requesters that generate memory requests as known in the art. For example, memory requesters may include video processing engines, 3D graphics drawing engines, GUI engines or any other suitable data processing mechanism which requests data to be read from memory. Also as known in the art, a typical request may include, for example, the address to be read from memory, the operation code such as whether the request is a read or a write request, the size or amount of data to be read, and any other suitable data. The request FIFOs 30a–30n receive read requests 32a–32n and store them in a first in, first out fashion. A request arbiter 34 receives the request and distinguishes between a request from a requester requesting data over the unregulated bus 14 and a requester requesting data over a regulated bus 26a and 26b. The memory command bus 26a and 26b between the frame buffer and the sequencer is considered to be regulated since the rate at which data may be obtained over the bus is controlled by the control sequencer or other suitable device. In contrast, the unregulated bus 14 provides data to the FIFO 12 at a rate that is uncontrollable by the sequencer or other suitable device. The arbiter routs the request for the unregulated channel to a host processor interface 40 which notifies the host that data is requested.

In addition to controlling the data read commands, the sequencer 20 also generates a data select signal 46 to control selection of data that is communicated over the memory read backbone 25. A multiplexing circuit 48 is responsive to the data select signal to select data either from the buffer 12 that receives data from the unregulated bus or from the frame buffer 22. Accordingly, the FIFO 12 is coupled to provide data 50 received over the unregulated bus 14 to the multiplexing circuit 48. In addition, the frame buffer is coupled to the multiplexer 48 through one or more read backbone buses 52a and 52b. These datapaths may also include FIFO buffers to avoid data loss during unavoidable collisions.

The unregulated bus 14 may be any suitable bus such as an AGP and/or PCI type bus as known in the art or any other suitable bus(es). In this embodiment, the unregulated bus has a bandwidth of approximately 1 gigabyte per second and the regulated bus has a bandwidth of approximately 4.5 gigabytes per second (two 64 bit channels) so that the bandwidth of the unregulated bus is less than the bandwidth of the regulated bus. However, it will be recognized by one of ordinary skill in the art that any suitable bandwidths may also benefit from the disclosed invention.

Figure 2:
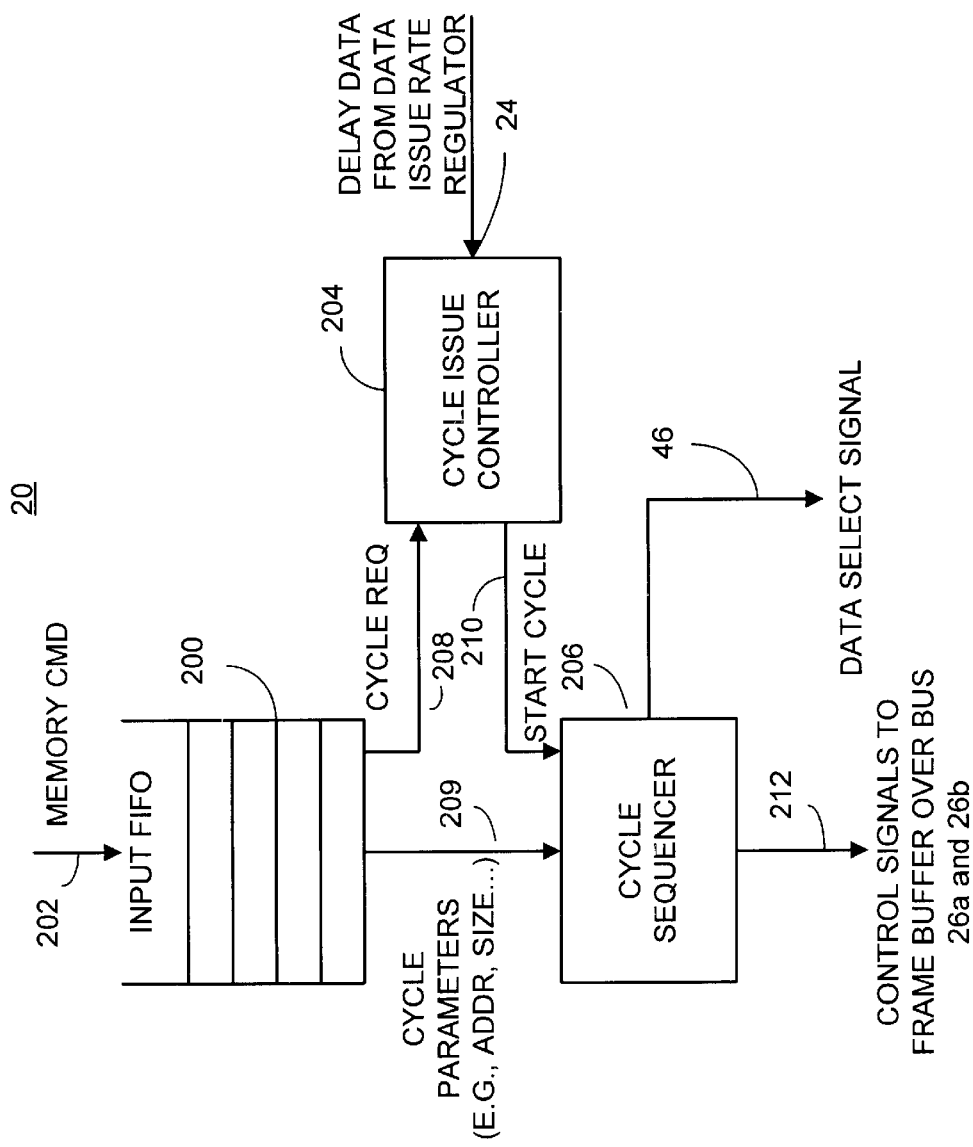
FIG. 2 is a block diagram illustrating one example of a sequencer with an adjustable delay in accordance with one embodiment of the invention.

FIG. 2 illustrates one embodiment of the sequencer 20 with the adjustable delay to variably control the rate at which data is obtained for a memory request. The sequencer 20 includes an input FIFO 200 that receives the memory command 202 included in the selected request 42. The sequencer also includes a cycle issue controller 204 and a cycle sequencer 206.

The memory command input FIFO 200 stores received memory commands on a first in first out basis. The data in the memory command is the data that is typically included in memory requests. As such, read cycle parameters 208 are determined from the memory command and used by the cycle sequencer 206. Read cycle parameters may include, for example, the read address, the size of the data or the amount of data to be obtained, and any other suitable information. As such, the input FIFO 200 serves as a memory request input command FIFO that stores memory request commands for obtaining data over the regulated bus.

The cycle issue controller 204 receives the data issue delay data 24 from the issue rate regulator and receives cycle request data 208. The issue delay data 24 represents an additional time delay before starting a memory cycle, this results in a delay of the returned data by the same amount of time. The cycle issue controller 204 generates start cycle data 210 indicating when to start the read cycle for reading memory from the frame buffer. The cycle issue controller is a finite state machine that traverses a sequence of operational states according to rules determined by the type of memory, the requested memory cycle and a set of timing rules. The timing rules, as known in the art, include the sequence timing of signals to a RAM interface.

The cycle sequencer 206 receives the start cycle data 210 along with the cycle parameters 209 and generates the requisite control signals over the regulated bus 26a and 26b to control the read operation from the frame buffer. The control signals are indicated as 212. In addition, the cycle sequencer 206 generates the data select signal 46 to also control when the data that is read from the buffer 12 is passed to the memory read backbone 25. The cycle issue controller 204 and cycle sequencer 206 may be any suitable hardware or software or combination thereof.

In operation, the sequencer 20 stores the memory request commands for at least one controlled channel in the memory request command FIFO. It then generates the start cycle data in response to the data issue delay data and in response to the cycle request data that is stored in the memory request input command FIFO. The sequencer produces a frame buffer read control signal 212 and a data select signal 46 in response to the start cycle data and in response to the cycle parameters to select data from the frame buffer or data from the buffer 12 based on the data issue delay data.

Figure 3:
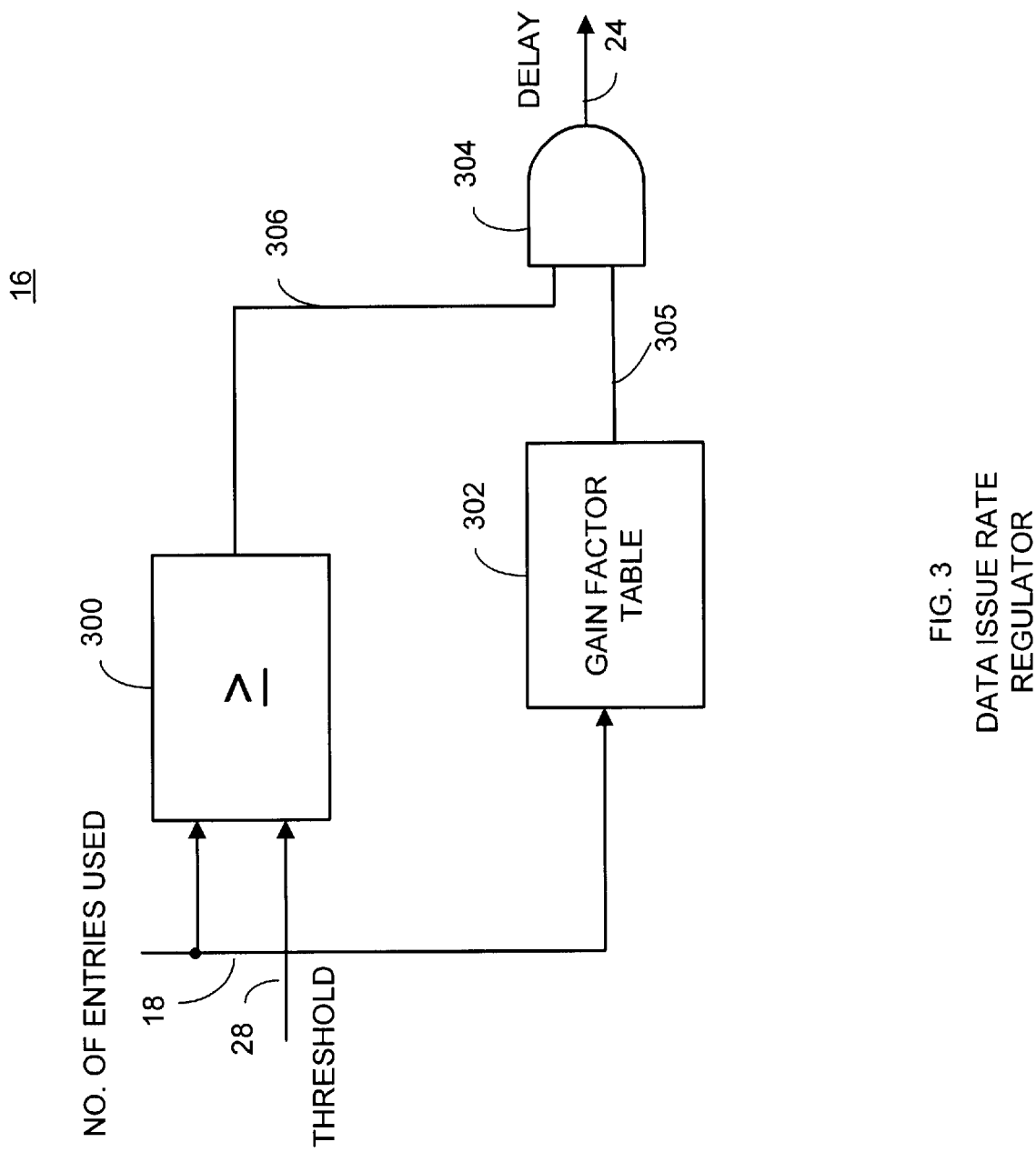
FIG. 3 is a block diagram illustrating an example of a data issue rate regulator in accordance with one embodiment of the invention.

FIG. 3 illustrates one embodiment of the data issue rate regulator 16 which receives the buffer entry feedback data 18 and the threshold 28 to determine whether a delay is necessary to allow the data on the unregulated bus to be transferred over the memory read backbone 25 to avoid data collision. In this example, the data issue rate regulator 16 includes a comparator circuit 300, a gain factor table 302, and a gating circuit 304. In operation, the comparator 300 compares the number of entries that have been used in the buffer 12 to the threshold to determine whether or not the number of entries that are filled is greater than the threshold. If the number of entries that are filled is greater than the threshold, and a gain factor associated with that number of entries indicates that a delay is required, and the issue delay data 24 is generated indicating the amount of delay required. The gain factor table may be, for example, a table that is accessed to determine the amount of delay necessary for a given number of entries that exceed the threshold. For example, a larger delay may be necessary if the number of entries that has exceeded the threshold is large whereas a smaller delay may be required if the number of entries exceeds the threshold by a lower amount.

Figure 4:
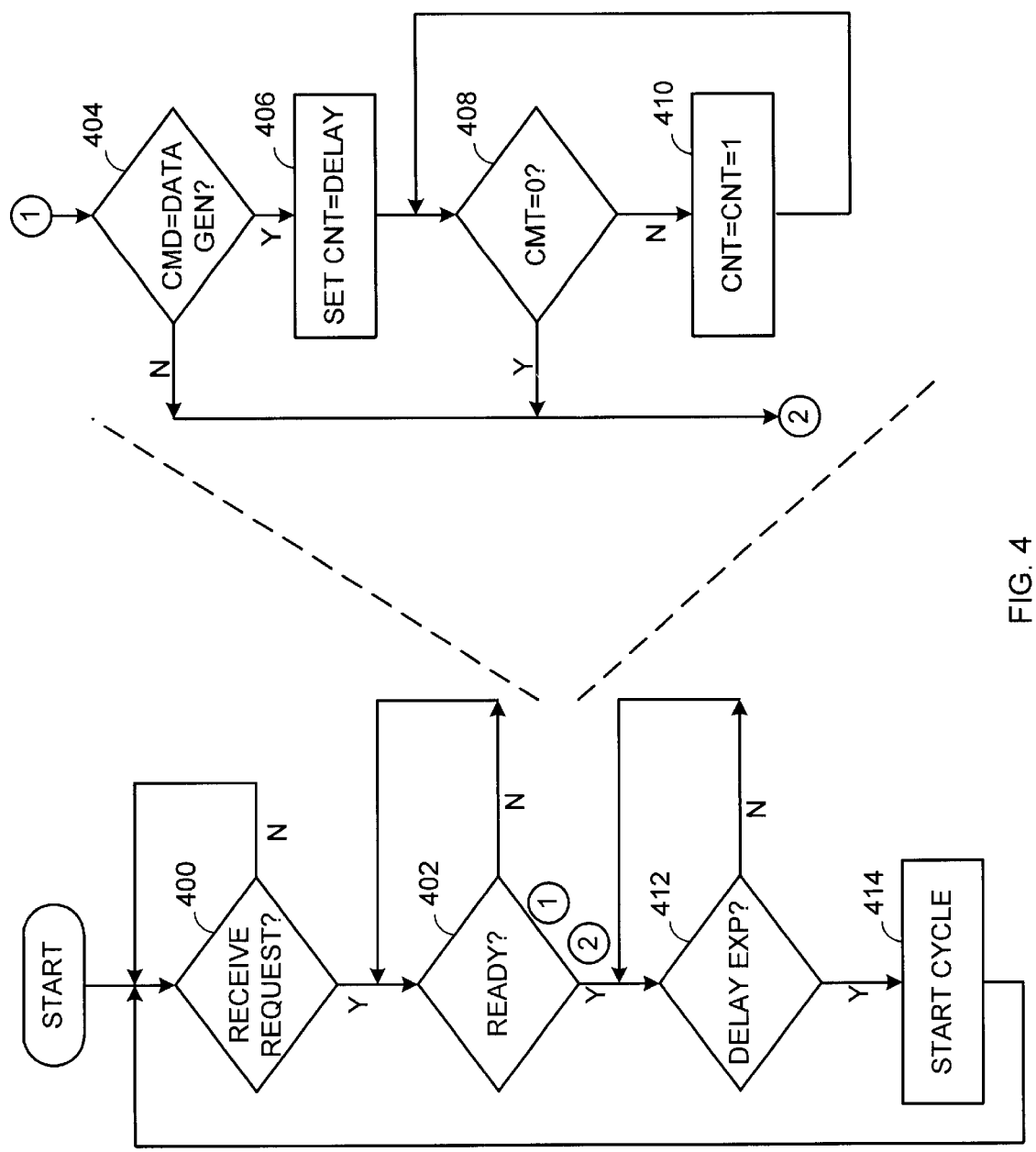
FIG. 4 is a flow chart illustrating an example of one method of operation of the apparatus shown in FIG. 1.

FIG. 4 illustrates one example of the operation of the apparatus in FIG. 1 wherein the apparatus determines whether it has received a memory request as shown in block 400. If a memory request has been received from the arbiter, a determination is made as to whether the request target is the system memory or the frame buffer. If the request is directed towards the frame buffer, a request to the sequencer 20 is made.

If the sequencer is ready to accept the request it acknowledges the cycle using the RTR/RTS handshake 25. A counter is then set equal to the delay as shown in block 406. The sequencer then determines whether the delay has expired as shown in block 408. If the delay has not expired, a counter is decremented as shown in block 410 and the sequencer holds the command data for the frame buffer until the delay period has expired, as shown in block 412. If the delay period has expired, the read cycle is started as shown in block 414. The process repeats each time the feedback data and the threshold information indicate that a delay is necessary. It will be recognized that only data generating commands or data reads to memory need to be delayed. Refresh commands or other commands that do not deliver data back to a requester need not be delayed.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A data bus bandwidth allocation apparatus comprising:
    a buffer operatively coupled to receive requested data from an unregulated bus;
    a data issue rate regulator operatively coupled to receive buffer entry feedback data and operative to generate data issue delay data; and
    an adjustable delay sequencer operatively responsive to the data issue delay data operative to adjust data read commands to a data source feeding a regulated bus.

2. The apparatus of claim 1 wherein the data source is memory and wherein the adjustable delay sequencer adjusts data flow over the regulated bus in response to the data issue delay data to avoid data collision between data returned from both the unregulated bus and regulated bus.

3. The apparatus of claim 2 including a plurality of memory requesters generating memory requests for data from memory and wherein the request data is memory request data.

4. The apparatus of claim 1 including a memory controller comprising the buffer the data issue rate regulator and the adjustable delay sequencer.

5. The apparatus of claim 1 wherein the unregulated bus has a first bandwidth and wherein the regulated bus has a second bandwidth wherein the first bandwidth is lower than the second bandwidth.

6. The apparatus of claim 1 wherein each request includes at least data representing an address of data to be read from the data source and at least a size of data to be read from the data source.

7. The apparatus of claim 3 including a request arbiter operatively responsive to the plurality of memory requests and operative to distinguish between a request from a requestor requesting data over the unregulated bus and a requester requesting data over a regulated bus and including a multiplexing circuit operatively responsive to select data from the buffer that receives data from the unregulated bus or from the data source that includes a frame buffer.

8. The apparatus of claim 1 wherein the regulated bus is coupled between the adjustable delay sequencer and the data source.

9. The apparatus of claim 8 wherein the unregulated bus has a bandwidth of at least 1 gigabyte per second and wherein the regulated bus has a bandwidth of 4.5 gigabytes per second.

10. The apparatus of claim 1 wherein the data issue rate regulator generates the data issue delay data in response to the buffer entry feedback data and in response to buffer threshold data.

11. A data bus bandwidth allocation apparatus comprising:
    a buffer operatively coupled to receive requested data from an unregulated bus;
    a data issue rate regulator operatively coupled to receive buffer entry feedback data and operative to generate data issue delay data in response to buffer threshold data and gain factor data; and
    an adjustable delay sequencer operatively responsive to the data issue delay data operative to adjust data read commands to frame buffer memory feeding a regulated memory read bus coupled to a plurality of memory data requestors, to facilitate data collision avoidance to the frame buffer memory.

12. The apparatus of claim 12 including a plurality of memory requestors generating memory requests for data from memory and wherein the request data is memory request data.

13. The apparatus of claim 11 including a memory controller comprising the buffer the data issue rate regulator and the adjustable delay sequencer.

14. The apparatus of claim 11 wherein the unregulated bus has a first bandwidth and wherein the regulated bus has a second bandwidth wherein the first bandwidth is lower than the second bandwidth.

15. The apparatus of claim 14 wherein each request includes at least data representing an address of data to be read from the data source and at least a size of data to be read from the data source.

16. The apparatus of claim 12 including a request arbiter operatively responsive to the plurality of memory requests and operative to distinguish between a request from a requester requesting data over the unregulated bus and a requestor requesting data over a regulated bus and including a multiplexing circuit operatively responsive to select data from the buffer that receives data from the unregulated bus or from the frame buffer memory.

17. The apparatus of claim 16 wherein the regulated bus is coupled between the adjustable delay sequencer and the data source.

18. The apparatus of claim 14 wherein the unregulated bus has a bandwidth of at least 1 gigabyte per second and wherein the regulated bus has a bandwidth of at least 4.5 gigabytes per second.

19. The apparatus of claim 16 wherein the adjustable delay sequencer includes:
   at least one memory request input command FIFO that stores memory request commands for at least one regulated bus;
   a cycle issue controller operatively responsive to the data issue delay data and to cycle request data stored in the memory request input command FIFO to generate start cycle data; and
   a cycle sequencer, operatively responsive to the start cycle data and to cycle parameters stored in the memory request input command FIFO, that produces frame buffer read control signals and data select signal to select data from the buffer or from the frame buffer memory based on the data issue delay data.

20. A data bus bandwidth allocation method comprising step including:
   receiving requested data over an unregulated bus;
   receiving buffer entry feedback data;
   generating data issue delay data based on the buffer entry feedback data; and
   adjusting data read commands to a data source used to feed a regulated bus, in response to the data issue delay data.

21. The method of claim 20 including generating memory requests for data from memory.

22. The method of claim 20 wherein the unregulated bus has a first bandwidth and wherein the regulated bus has a second bandwidth wherein the first bandwidth is lower than the second bandwidth.

23. The method of claim 20 wherein each request includes at least data representing an address of data to be read from the data source and at least a size of data to be read from the data source.

24. The method of claim 21 including arbitrating among the plurality of memory requests and distinguishing between a request from a requestor requesting data over the unregulated bus and a requestor requesting data over a regulated bus and including the step of selecting data from the buffer that receives data from the unregulated bus or from a frame buffer in a sequence based on the data issue delay data.

25. The method of claim 20 including generating the data issue delay data in response to the buffer entry feedback data and in response to buffer threshold data.

26. The method of claim 20 including the steps of:
   storing memory request commands for at least one controlled channel in a memory request input command FIFO;
   generating start cycle data in response to the data issue delay data and to cycle request data stored in the memory request input command FIFO; and
   producing a frame buffer read control signal and a data select signal in response to the start cycle data and to cycle parameters stored in the memory request input command FIFO, to select data from the buffer or from the frame buffer based on the data issue delay data.

27. A data bus bandwidth allocation method comprising the steps of:
   receiving requested data from an unregulated bus;
   generating data issue delay data; and
   adjusting data read commands to a data source feeding a regulated bus in response to the generated data issue delay data.

28. The method of claim 27 including generating memory requests for data from memory.

29. The method of claim 27 wherein the unregulated bus has a first bandwidth and wherein the regulated bus has a second bandwidth wherein the first bandwidth is lower than the second bandwidth.

30. The method of claim 27 wherein each request includes at least data representing an address of data to be read from the data source and at least a size of data to be read from the data source.

31. A data bus bandwidth allocation apparatus, comprising:
   a buffer operatively coupled to receive requested data from an unregulated bus;
   a data issue rate regulator operatively coupled to receive buffer entry feedback data and operative to generate data issue delay data; and
   an adjustable delay sequencer operative to adjust data flow over a regulated bus in response to the data issue delay data to avoid data collision between data returned from both the unregulated bus and regulated bus.

32. The apparatus of claim 31, wherein the data source is a memory.

33. The apparatus of claim 32, further including a plurality of memory requestors generating memory requests for data from memory and wherein the request data is memory request data.

34. The apparatus of claim 31, further including a memory controller comprising the buffer the data issue rate regulator and the adjustable delay sequencer.

35. The apparatus of claim 31, wherein the unregulated bus has a first bandwidth and wherein the regulated bus has a second bandwidth, wherein the first bandwidth is lower than the second bandwidth.

36. The apparatus of claim 31, wherein each request includes at least data representing an address of data to be read from the data source and at least a size of data to be read from the data source.

37. The apparatus of claim 33, further including a request arbiter operatively responsive to the plurality of memory requests and operative to distinguish between a request from a requestor requesting data over the unregulated bus and a requester requesting data over a regulated bus and including a multiplexing circuit operatively responsive to select data from the buffer that receives data from the unregulated but or from the data source that includes a frame buffer.

38. The apparatus of claim 31, wherein the regulated bus is coupled between the adjustable delay sequencer and the data source.

39. The apparatus of claim 38, wherein the unregulated bus has a bandwidth of at least 1 gigabyte per second and wherein the regulated bus has a bandwidth of 4.5 gigabytes per second.

40. The apparatus of claim 31, wherein the data issue rate regulator generates the data issue delay data in response to the buffer entry feedback data and in response to buffer threshold data.

41. A data bus bandwidth allocation method, comprising the steps of:
   receiving requested data over an unregulated bus having a first bandwidth receiving buffer entry feedback data;

generating data issue delay data based on the buffer entry feedback data; and adjusting data read commands to a data source used to feed a regulated bus having a second bandwidth that is lower than the first bandwidth, in response to the data issue delay data.

42. The method of claim 41, further including generating memory requests for data from memory.

43. The method of claim 41, wherein each request includes at least data representing an address of data to be read from the data source and at least a size of data to be read from the data source.

44. The method of claim 42, further including arbitrating among the plurality of memory requests and distinguishing between a request from a requestor requesting data over the unregulated bus and a requestor requesting data over a regulated bus, and including the step of selecting data from the buffer that receives data from the unregulated bus or from a frame buffer in a sequence based on the data issue delay data.

45. The method of claim 41, further including the step of generating the data issue delay data in response to the buffer entry feedback data and in response to buffer threshold data.

46. The method of claim 41, further including the steps of:

storing memory request commands for at least one controlled channel in a memory request input command FIFO;

generating start cycle data in response to the data issue delay data and to cycle request data stored in the memory request input command FIFO; and producing a frame buffer read control signal and a data select signal in response to the start cycle data and to cycle parameters stored in the memory request input command FIFO, to select data from the buffer or from the frame buffer based on the data issue delay data.

\* \* \* \* \*